(12) United States Patent
Sakuma

(10) Patent No.: US 7,036,826 B2
(45) Date of Patent: May 2, 2006

(54) CONTINUOUS EXTRUSION MOLDING SYSTEM FOR A WEATHERSTRIP

(75) Inventor: Noboru Sakuma, Hiroshima (JP)

(73) Assignee: Nishikawa Rubber Co., Ltd., Hiroshima (JP)

(*) Notice: Subject to any disclaimer, the term of this patent is extended or adjusted under 35 U.S.C. 154(b) by 21 days.

(21) Appl. No.: 10/717,261

(22) Filed: Nov. 19, 2003

(65) Prior Publication Data
US 2004/0104543 A1 Jun. 3, 2004

Related U.S. Application Data

(62) Division of application No. 10/175,650, filed on Jun. 20, 2002, now Pat. No. 6,686,020.

(30) Foreign Application Priority Data

Jul. 3, 2001 (JP) ......................................... 2001-201887
Mar. 15, 2002 (JP) ......................................... 2002-071309

(51) Int. Cl.
B32B 3/04 (2006.01)

(52) U.S. Cl. .................... 277/628; 428/122; 428/137
(58) Field of Classification Search ................ 277/628; 428/122, 137
See application file for complete search history.

(56) References Cited

U.S. PATENT DOCUMENTS 5,512,234 A * 4/1996 Takizawa et al. ........... 264/511
5,618,608 A   4/1997 Teishi

* cited by examiner

Primary Examiner—Enoch Peavey
(74) Attorney, Agent, or Firm—Flynn, Thiel, Boutell & Tanis, P.C.

(57) ABSTRACT

A continuous extrusion molding system for continuously extrusion molding a weather strip for an automobile includes a prickly gear, rotatable while pressed in contact with the weather strip being extruded, and disposed so as to be adjacent to a mouth piece of an extruder. Tiny holes having a depth reaching a core bar are defined preferably in a groove bottom of a U-like shape of a part of a slightly foamed solid rubber portion, in such a way as to be arranged in line along the longitudinal direction of the weather strip by use of the prickly gear.

11 Claims, 4 Drawing Sheets

CONTINUOUS EXTRUSION MOLDING SYSTEM FOR A WEATHERSTRIP

This a division of Ser. No. 10/175,650, filed Jun. 20, 2002 now U.S. Pat. No. 6,686,020.

FIELD OF THE INVENTION

The invention relates to a weather strip for an automobile, comprising a slightly foamed solid rubber portion with a core bar embedded therein, and a continuous extrusion molding system for molding the same.

BACKGROUND OF THE INVENTION

On the basis of FIGS. 1 to 3, the related art is described hereinafter referring to FIG. 5. When a weather strip 20 for an automobile, comprising a U-shaped trim 2 formed by embedding a core bar 4 in a slightly foamed solid rubber portion 3, is molded with a continuous extrusion molding system, a void 21 is prone to occur to a boundary part between the core bar 4 and the slightly foamed solid rubber portion 3 due to a gas pocket formed. The reason for this is because a blowing agent contained in the slightly foamed solid rubber portion 3 is gasified as a result of being heated up by heat generated at the time of extrusion molding with an extruder 11, and being heated up in a vulcanizing furnace 15, and gas thus generated in part of the slightly foamed solid rubber portion 3, in close proximity to the core bar 4, is not turned into bubbles, thereby gathering towards the core bar 4.

The void 21 tends to occur in a groove bottom 3a of a U-like shape of a part of the slightly foamed solid rubber portion 3, substantially resembling the letter U, taking a tunnel form at times, or occurring at a number of successive places to a size in the order of 5 mm at other times. In case that the void 21 occurs to the slightly foamed solid rubber portion 3, the slightly foamed solid rubber portion 3 is peeled off from the core bar 4, and will be in floating condition, causing difficulty with conveying holding force of rubber to the core bar 4 when pushing out the core bar 4 at the time of extrusion molding, that is, at the time of breakout, so that the breakout of the core bar 4 can not be implemented with ease. If the holding force is increased for that reason, the surface of the slightly foamed solid rubber portion 3 is prone to be marred with holding marks, thereby aggravating external appearance. In addition, presence of the void 21 interferes with attachment of the weather strip to a flange. Further, if the void 21 occurs to an outer part 3b of the solid rubber portion 3, this also will result in poor external appearance.

A thermoplastic elastomer comprises a rubber component (soft segment) for exhibiting elasticity, and a resin component (hard segment) for fluidizing at a high temperature and blocking plastic deformation at room temperature, and the same is material that can be plasticized at high temperature to be molded in the same way as a thermoplastic resin. A thermoplastic elastomer containing olefin-based components is called an olefin thermoplastic elastomer (referred to as TPO).

Thus, with the weather strip 20 for the automobile, comprising the slightly foamed solid rubber portion 3 with the core bar 4 embedded therein, that is extrusion molded with the conventional continuous extrusion molding system, the void 21 is prone to occur to the boundary part between the core bar 4 and the slightly foamed solid rubber portion 3, and interferes with the attachment of the weather strip to the flange, resulting in poor external appearance. It is therefore an object of the invention to provide a weather strip causing no such problems, and a continuous extrusion molding system for molding the same.

SUMMARY OF THE INVENTION

Referring to FIGS. 1, 2, 4, and 5, description is given hereinafter. In the first aspect of the invention, there is provided a weather strip 1 for an automobile comprising a U-shaped trim 2 formed by embedding a core bar 4 in a slightly foamed solid rubber portion 3, foamed so as to have a specific gravity of 0.8 to 1.2, wherein tiny holes 7 having a depth reaching the core bar 4 are defined in part of the slightly foamed solid rubber portion 3, within the U-shaped trim 2, in such a way as to be arranged in line along the longitudinal direction of the weather strip 1.

With the weather strip 1 for the automobile, having those features, tiny holes 7 having a depth reaching the core bar 4 are defined in a groove bottom of a U-like shape of part of the slightly foamed solid rubber portion, within the U-shaped trim, in such a way as to be arranged in line along the longitudinal direction of the weather strip 1.

Further, with the weather strip 1 for the automobile, having those features, tiny holes 7 having a depth reaching the core bar 4 may be defined in an outer part 3b of the slightly foamed solid rubber portion 3, visible from outside, in such a way as to be arranged in line along the longitudinal direction of the weather strip 1, and the tiny holes 7 are preferably sealed with a coating 8 formed of a thermoplastic elastomer or resin.

The invention provides in its second aspect a continuous extrusion molding system 10 for continuously extrusion molding a weather strip 1 for an automobile, comprising the U-shaped trim 2 formed by embedding a core bar 4 in a slightly foamed solid rubber portion 3, comprising a prickly gear 13, rotatable while pressed in contact with the weather strip 1 being extruded, and disposed so as to be adjacent to a mouth piece 12 of an extruder 11, wherein tiny holes 7 having a depth reaching the core bar 4 are defined in part of the slightly foamed solid rubber portion 3, within the U-shaped trim 2, in such a way as to be arranged in line along the longitudinal direction of the weather strip 1 by use of the prickly gear 13.

Further, with the continuous extrusion molding system 10 having those features, tiny holes 7 may be sealed with a coating 8 formed of a thermoplastic elastomer or resin, formed on the surface of the slightly foamed solid rubber portion 3, by use of a coating unit 16 after the tiny holes 7 having the depth reaching the core bar 4 are defined in part of the slightly foamed solid rubber portion 3, within the U-shaped trim 2, in such a way as to be arranged in line along the longitudinal direction of the weather strip 1 by use of the prickly gear 13.

DESCRIPTION OF THE PREFERRED EMBODIMENTS

Figure 1:
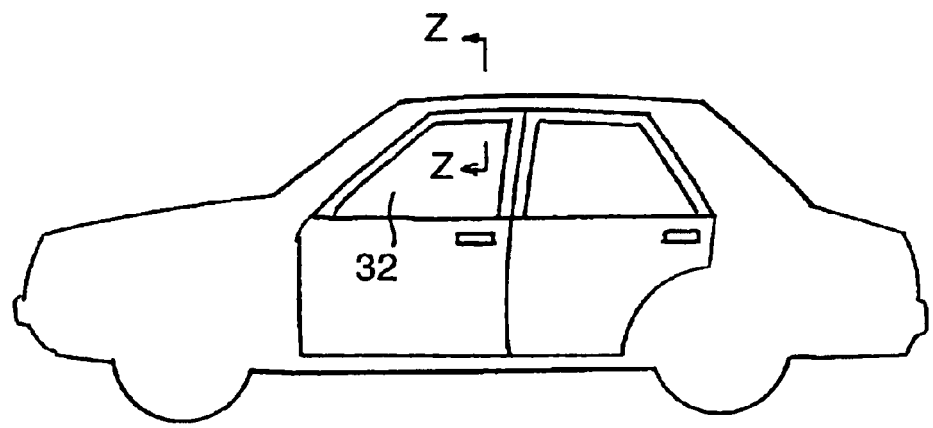
FIG. 1 is a side view of an automobile with a weather strip attached thereto.
Figure 2:
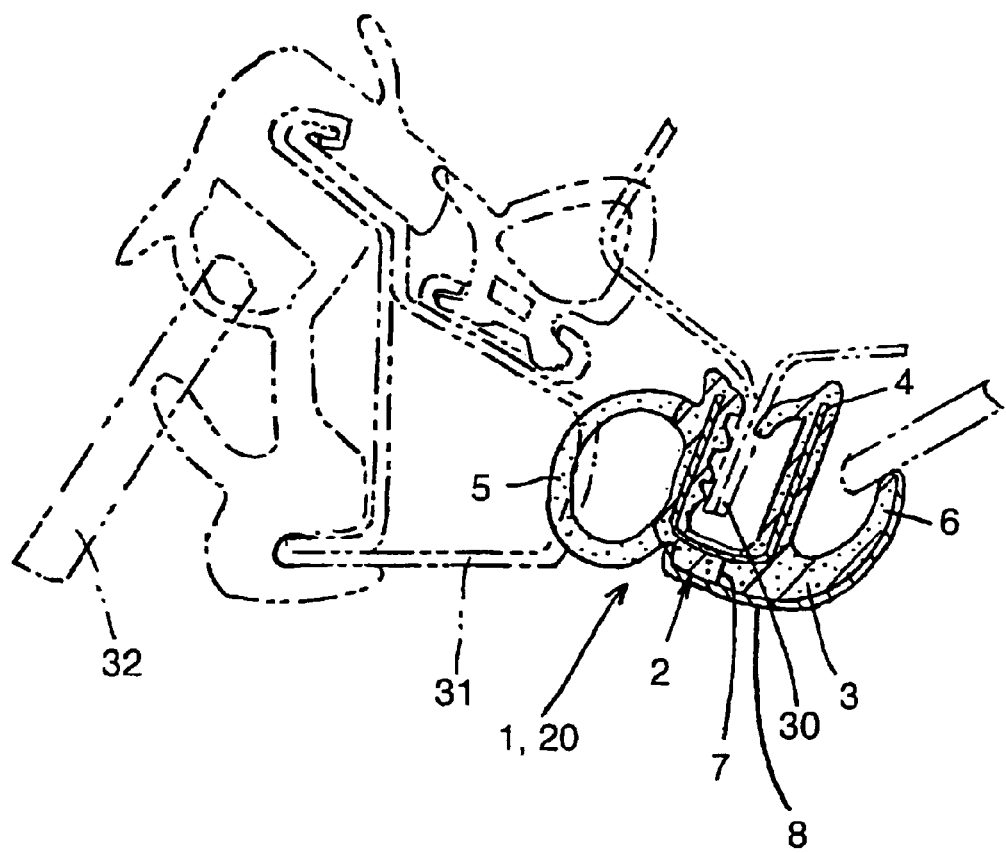
FIG. 2 is a cross-sectional view of the weather strip for the automobile, taken on line Z—Z in FIG. 1.
Figure 3:
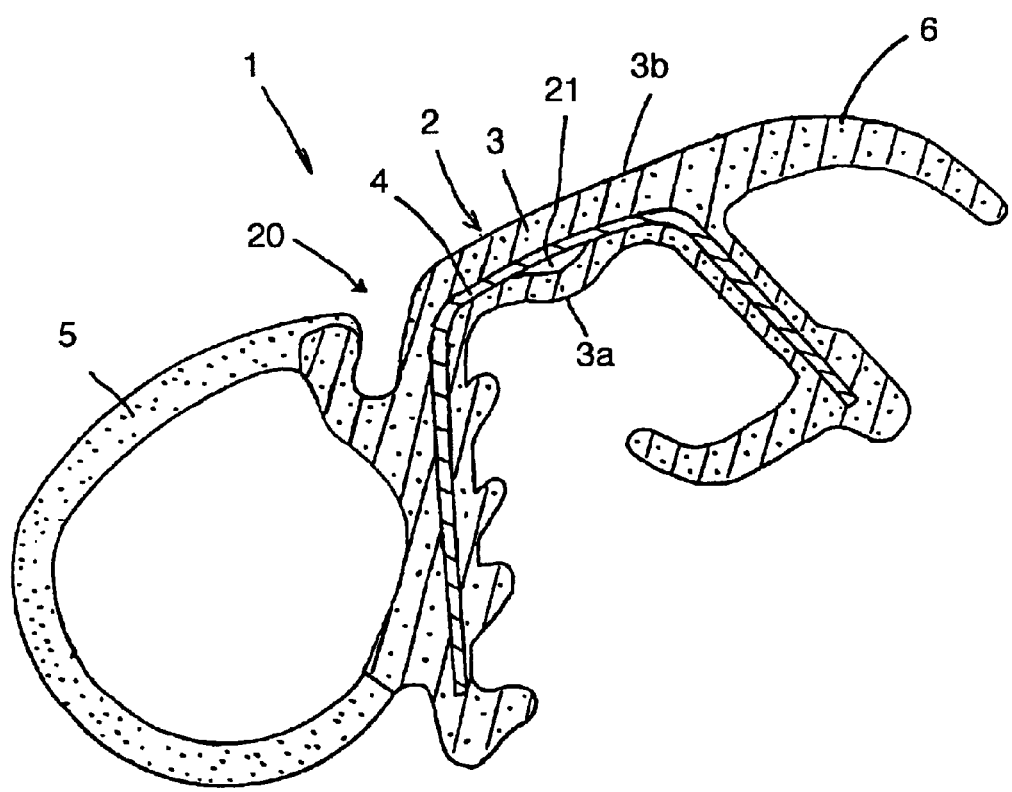
FIG. 3 is a cross-sectional view of a conventional weather strip for an automobile.
Figure 4:
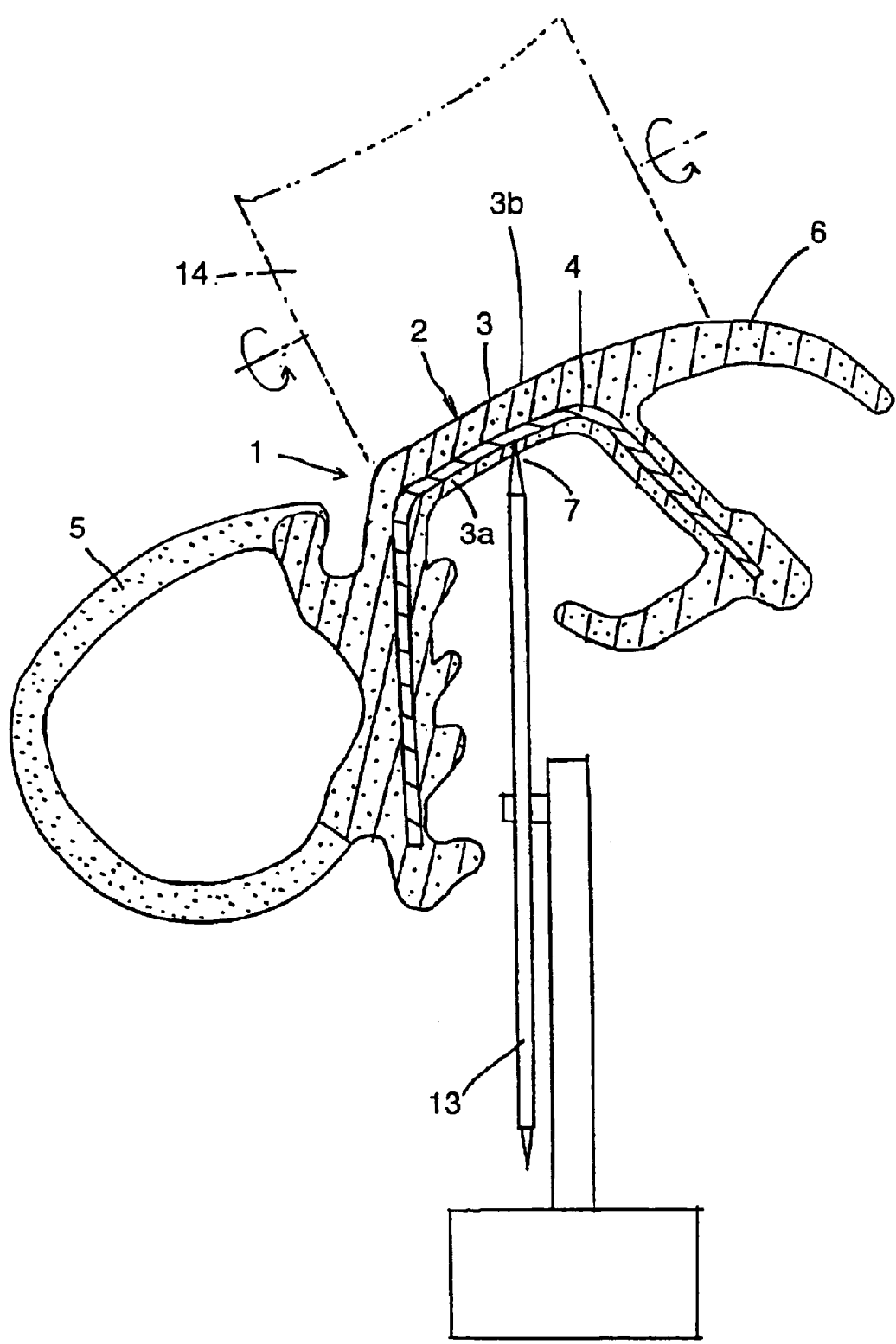
FIG. 4 is a cross-sectional view showing an embodiment of a weather strip for an automobile according to the invention, and a prickly gear and so forth of an embodiment of a continuous extrusion molding system for molding the weather strip for the automobile, according to the invention.

FIGS. 1, 2, and 4 show an embodiment of a weather strip 1 for an automobile, according to the invention. The same comprises a U-shaped trim 2 formed by embedding a core bar 4 in a slightly foamed solid rubber portion 3 foamed to have a specific gravity of 0.8 to 1.2, and the slightly foamed solid rubber portion 3 has tiny holes 7 having a depth reaching the core bar 4, defined so as to be arranged in line along the longitudinal direction of the weather strip 1, in order to discharge gas evolved inside the slightly foamed solid rubber portion 3 at the time of extrusion molding and vulvanization into the air.

The weather strip 1 for the automobile, according to the embodiment, is attached to a flange 30 (or a flange at the rim of a door) at the rim of an opening of an automobile body, and a hollow seal portion which is a sponge rubber portion 5 for elastically contacting a door (or a body panel), and a lip portion 6 of the slightly foamed solid rubber portion 3, for elastically contacting the body panel (or the door), are formed integrally with the U-shaped trim 2, which is part of the slightly foamed solid rubber portion 3, fitted to the flange 30. In the figures, a door frame is denoted by reference numeral 31, and a door glass is denoted by reference numeral 32.

With the present embodiment, the tiny holes 7 are defined in a groove bottom 3a of a U-like shape of the U-shaped trim 2. As the groove bottom 3a is a part normally most prone to occurrence of a void 21, gas can be discharged into the air by forming the tiny holes 7 therein, thereby preventing the void 21 from occurring.

Further, occurrence of the void 21 will not be limited to the part described. Accordingly, the tiny holes 7 are formed as necessary in any parts of the slightly foamed solid rubber portion 3, such as an outer part 3b of the U-shaped trim 2, both right side and left side parts thereof, and so forth, as targets for the formation of the tiny holes 7.

In the case where the tiny holes 7 are defined in the outer part 3b visible from outside, the tiny holes 7 are sealed with a coating 8 formed of a thermoplastic elastomer or resin after gas is discharged through the tiny holes 7, thereby enhancing agreeableness in appearance.

Furthermore, the slightly foamed solid rubber portion 3 of the weather strip has a specific gravity lowered to a suitable extent of a range of 0.8 to 1.2 by foaming, and consequently, reduction in weight is implemented without impairing mechanical strength required of the weather strip.

Figure 5:
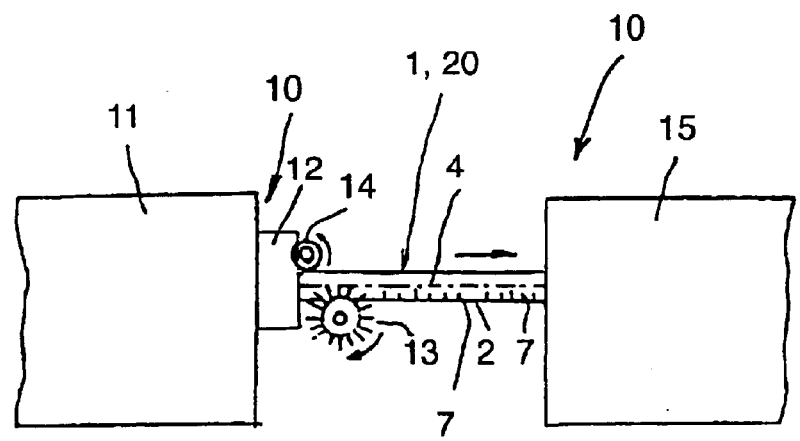
FIG. 5 is a side view of the embodiment of the continuous extrusion molding system for molding the weather strip for the automobile, according to the invention.
Figure 6:
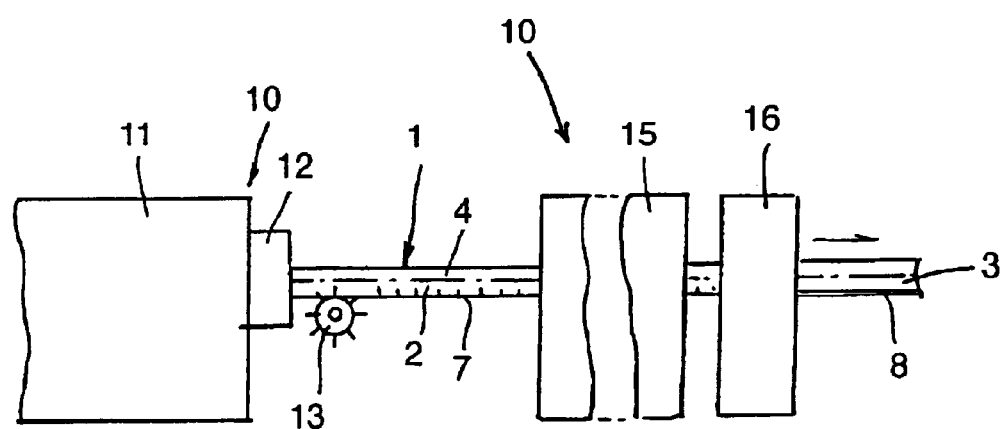
FIG. 6 is a side view showing another embodiment of a continuous extrusion molding system for molding the weather strip for the automobile, according to the invention.

FIGS. 4 and 5 show an embodiment of a continuous extrusion molding system 10 for the weather strip for the automobile, according to the invention. The continuous extrusion molding system 10 is a system for continuously extrusion molding the weather strip 1 for the automobile, comprising the U-shaped trim 2 formed by embedding the core bar 4 in the slightly foamed solid rubber portion 3, and is provided with a prickly gear 13, rotatable while pressed in contact with the weather strip being extruded, disposed so as to be adjacent to a mouth piece 12 of an extruder 11. The tiny holes 7 having the depth reaching the core bar 4 are defined in the slightly foamed solid rubber portion 3 by use of the prickly gear 13 in such a way as to be arranged in line along the longitudinal direction of the weather strip 1, thereby discharging gas evolved inside the slightly foamed solid rubber portion 3 in the air.

In the case where the tiny holes 7 are defined in the outer part 3b of the U-like shape of a part of the slightly foamed solid rubber portion 3, agreeableness in appearance can be enhanced if the tiny holes 7 are covered with, and sealed by the coating 8 formed of a thermoplastic elastomer or resin after gas is discharged. In this case, for example, the tiny holes 7 may be defined so as to be arranged in line immediately after the weather strip 1 is extruded out of the mouth piece 12, and thereafter, the tiny holes 7 may be continuously coated with resin by use of a coating unit (another extruder, and so forth) 16 after vulcanization in a vulcanizing furnace 15.

With the present embodiment, the prickly gear 13 is disposed at a spot about 20 mm away from the mouth piece 12, continuously forming the tiny holes 7 in the groove bottom 3a of the U-like shape of the U-shaped trim 2 so as to be arranged in line along the longitudinal direction of the weather strip 1. Further, an embossing roll 14 is rotatably attached to the mouth piece 12 so as to be rolled along on the outer face of the U-shaped trim 2 for continuously cutting an embossed pattern thereon. The weather strip 1 molded with the continuous extruding system 10 is sent out to the vulcanizing furnace 15 to be heated therein for vulcanization.

Since the weather strip 1 molded with the continuous extruding system 10 is provided with the tiny holes 7 having the depth reaching the core bar 4, defined in the slightly foamed solid rubber portion 3, in the U-shaped trim 2, so as to be arranged in line along the longitudinal direction of the weather strip 1, gas evolved inside the slightly foamed solid rubber portion 3 due to heat at the time of extrusion molding and vulvanization can be discharged into the air. Accordingly, the void 21 can be prevented from occurring.

The weather strip 1 passing through the vulcanizing furnace 15 may be at times fitted to the flange 30 of the automobile body after two legs of the core bar 4 in a shape substantially resembling the letter U are bent so as to be parallel with each other as shown in FIG. 2.

In the first aspect of the invention, the weather strip 1 for the automobile is provided with the tiny holes 7 having the depth reaching the core bar 4, defined in the slightly foamed solid rubber portion 3, and consequently, gas evolved inside the slightly foamed solid rubber portion 3 at the time of extrusion molding and vulvanization can be discharged into the air, thereby preventing the void 21 from occurring to the boundary part between the slightly foamed solid rubber portion 3 and the core bar 4. Accordingly, it is possible to solve problems such as difficulty with fitting the weather strip 1 for the automobile to the flange 30, and occurrence of poor external appearance.

With the weather strip 1 for the automobile, having those features, the tiny holes 7 are preferably sealed with a coating 8 formed of a thermoplastic elastomer or resin, so that deterioration of agreeableness in appearance does not occur.

The invention provides in its second aspect the continuous extrusion molding system 10 for continuously extrusion molding the weather strip for the automobile, comprising the prickly gear 13, rotatable while pressed in contact with the weather strip 1 being extruded, and disposed so as to be adjacent to the mouth piece 12 of the extruder 11, wherein a multitude of the tiny holes 7, having the depth reaching the core bar 4, are defined in the slightly foamed solid rubber portion 3, so that gas evolved inside the slightly foamed solid rubber portion 3 can be discharged into the air. Accordingly, occurrence of the void 21 can be prevented, thereby solving the problems such as difficulty with fitting the weather strip 1 for the automobile to the flange 30, and occurrence of poor external appearance.

Further, with the continuous extrusion molding system 10 having those features, wherein the tiny holes 7 formed in the outer part 3b of the slightly foamed solid rubber portion 3 are sealed with a coating 8 formed of a thermoplastic elastomer or resin by use of a coating unit 16, deterioration of agreeableness in appearance of the weather strip 1 as molded can be prevented.

What is claimed is:

1. A continuous extrusion molding system for continuously extrusion molding a weather strip for an automobile, comprising a U-shaped trim formed by embedding a core bar in a slightly foamed solid rubber portion, said molding system comprising a prickly gear, rotatable while pressed in contact with the weather strip being extruded, and disposed so as to be adjacent to a mouth piece of an extruder, wherein tiny holes having a depth reaching the core bar are defined in part of the slightly foamed solid rubber portion, within the U-shaped trim, in such a way as to be arranged in line along the longitudinal direction of the weather strip by use of the prickly gear, and a vulcanizing furnace for vulcanizing the U-shaped trim while the holes enable discharge of gas evolved inside the slightly foamed solid rubber portion.

2. The continuous extrusion molding system for continuously extrusion molding a weather strip for an automobile according to claim 1, and further comprising a coating unit for sealing the tiny holes with a coating of a thermoplastic elastomer or resin, formed on the surface of the slightly foamed solid rubber portion.

3. A continuous extrusion molding system for forming a weather strip for an automobile, comprising:
   an extruder having a mouth piece, said extruder outputting a slightly foamed solid rubber portion for embedding a core bar;
   a prickly gear disposed adjacent the mouth piece, the prickly gear rotatable when pressed in contact with the slightly foamed solid rubber portion being extruded for forming holes in a face of the slightly foamed solid rubber portion, the holes having a depth reaching the core bar; and
   a vulcanizing furnace for receiving and vulcanizing the slightly foamed solid rubber portion, the holes enabling gas evolved inside the slightly foamed rubber portion to discharge therefrom while forming the slightly foamed rubber portion and the embedded core bar into a weather strip.

4. The continuous extrusion molding system according to claim 3, further comprising a coating unit for coating and sealing the holes in the face of the slightly foamed solid rubber portion with a thermoplastic elastomer or resin.

5. The continuous extrusion molding system according to claim 3, wherein said prickly gear comprises a rotatable wheel including a plurality of spaced radially outwardly projecting elongate elements, each said elongate element having a radially outwardly projecting tip.

6. A continuous extrusion molding system for forming a weather strip for an automobile, comprising:
   means for providing a core bar;
   an extruder having a mouth piece, said extruder arranged to output a slightly foamed solid rubber portion so that the core bar is embedded therein;
   a prickly gear disposed adjacent the mouth piece for rotating when pressed in contact with the slightly foamed solid rubber portion being extruded for forming holes in a face of the slightly foamed solid rubber portion; and
   a vulcanizing furnace for receiving and vulcanizing the slightly foamed solid rubber portion, the holes enabling gas evolved inside the slightly foamed solid rubber portion to discharge during vulcanization, while forming the weather strip.

7. The continuous extrusion molding system according to claim 6, including a coating unit for coating the weather strip with a thermoplastic elastomer or resin.

8. The continuous extrusion molding system according to claim 7, including a bending means for forming the weather strip as a U-shaped weather strip.

9. The continuous extrusion molding system according to claim 8, including an embossing roll adjacent the exterior mouth piece and the prickly gear for embossing the slightly foamed solid rubber portion output therefrom.

10. The continuous extrusion molding system according to claim 8, wherein said prickly gear comprises a rotatable wheel including a plurality of spaced radially outwardly projecting elongate elements, each said elongate element having a radially outwardly projecting tip for forming the holes.

11. The continuous extrusion molding system according to claim 6, wherein said prickly gear comprises a rotatable wheel including a plurality of spaced radially outwardly projecting elongate elements, each said elongate element having a radially outwardly projecting tip for forming the holes.

* * * * *